(12) United States Patent
Ishikawa et al.

(10) Patent No.: US 8,983,977 B2
(45) Date of Patent: Mar. 17, 2015

(54) QUESTION ANSWERING DEVICE, QUESTION ANSWERING METHOD, AND QUESTION ANSWERING PROGRAM

(75) Inventors: Kai Ishikawa, Tokyo (JP); Susumu Akamine, Tokyo (JP)

(73) Assignee: NEC Corporation, Tokyo (JP)

( * ) Notice: Subject to any disclaimer, the term of this patent is extended or adjusted under 35 U.S.C. 154(b) by 1287 days.

(21) Appl. No.: 12/281,350

(22) PCT Filed: Feb. 20, 2007

(86) PCT No.: PCT/JP2007/053034
§ 371 (c)(1),
(2), (4) Date: Sep. 2, 2008

(87) PCT Pub. No.: WO2007/099812
PCT Pub. Date: Sep. 7, 2007

(65) Prior Publication Data
US 2009/0012926 A1 Jan. 8, 2009

(30) Foreign Application Priority Data
Mar. 1, 2006 (JP) .................. 2006-054706

(51) Int. Cl.
*G06F 7/00* (2006.01)
*G06F 17/30* (2006.01)

(52) U.S. Cl.
CPC .... *G06F 17/30654* (2013.01); *G06F 17/30401* (2013.01); *G06F 17/30646* (2013.01); *G06F 17/30663* (2013.01); *G06F 17/30666* (2013.01)
USPC .......................................... 707/750; 707/771

(58) Field of Classification Search
CPC ................... G06F 17/30401; G06F 17/30646; G06F 17/30663; G06F 17/30666
USPC .................................. 707/748–750, 769, 771
See application file for complete search history.

(56) References Cited

U.S. PATENT DOCUMENTS

| 6,087,612 | A  | * | 7/2000  | Robitschko et al. | 219/87  |
|-----------|----|---|---------|-------------------|---------|
| 6,246,787 | B1 | * | 6/2001  | Hennessey et al.  | 382/141 |
| 6,498,921 | B1 | * | 12/2002 | Ho et al.         | 434/362 |
| 6,631,377 | B2 | * | 10/2003 | Kuzumaki          | 434/322 |
| 6,745,161 | B1 | * | 6/2004  | Arnold et al.     | 704/7   |
| 6,766,320 | B1 | * | 7/2004  | Wang et al.       | 1/1     |
| 7,020,580 | B2 | * | 3/2006  | Peters et al.     | 702/183 |
| 7,027,612 | B2 | * | 4/2006  | Patterson et al.  | 382/100 |

(Continued)

FOREIGN PATENT DOCUMENTS

| JP | 11-66086    | 3/1999 |
|----|-------------|--------|
| JP | 2002-278977 | 9/2002 |

(Continued)

OTHER PUBLICATIONS

JP Office Action dated Dec. 6, 2011, with English Translation.

*Primary Examiner* — Jeffrey A Burke
(74) *Attorney, Agent, or Firm* — Young & Thompson (57) ABSTRACT

A question-answering device, a question-answering method, and a question-answering program that can obtain an answer to an inputted query with high probability are described. A score calculation element 305 determines a matching degree between the group of the style and the topic of an inputted query and the group of the style and the topic of the query of question-answer pairs. A search result presentation element 306 narrows the question-answer pairs on the basis of the matching degree.

14 Claims, 9 Drawing Sheets

(56) References Cited

U.S. PATENT DOCUMENTS

| | | | |
|---|---|---|---|
| 7,269,545 B2* | 9/2007 | Agichtein et al. | 704/9 |
| 7,444,279 B2* | 10/2008 | Murata | 704/9 |
| 7,587,389 B2* | 9/2009 | Sugihara et al. | 1/1 |
| 7,640,074 B2* | 12/2009 | Bajocich et al. | 700/186 |
| 7,966,316 B2* | 6/2011 | Cao et al. | 707/721 |
| 2002/0138337 A1 | 9/2002 | Yanase et al. | |
| 2003/0101153 A1* | 5/2003 | Francis et al. | 706/47 |
| 2003/0191766 A1* | 10/2003 | Elin | 707/100 |
| 2005/0060327 A1* | 3/2005 | Kawahara et al. | 707/100 |
| 2005/0114327 A1* | 5/2005 | Kumamoto et al. | 707/3 |
| 2005/0172231 A1* | 8/2005 | Myers | 715/716 |
| 2005/0203758 A1* | 9/2005 | Blum et al. | 705/1 |
| 2006/0061595 A1* | 3/2006 | Goede et al. | 345/619 |
| 2006/0235689 A1* | 10/2006 | Sugihara et al. | 704/257 |
| 2006/0274932 A1* | 12/2006 | Ikeda et al. | 382/145 |
| 2006/0286530 A1* | 12/2006 | Forrest et al. | 434/323 |
| 2007/0047002 A1* | 3/2007 | Hull et al. | 358/3.28 |
| 2007/0073683 A1* | 3/2007 | Kobayashi et al. | 707/6 |
| 2007/0186417 A1* | 8/2007 | Smyth | 29/894 |
| 2008/0104065 A1* | 5/2008 | Agarwal et al. | 707/6 |

FOREIGN PATENT DOCUMENTS

| | | |
|---|---|---|
| JP | 2003-6207 | 1/2003 |
| JP | 2004-139553 | 5/2004 |
| JP | 2005-157524 | 6/2005 |

* cited by examiner

INPUTTED QUERY :
I'D LIKE TO KNOW MAXIMUM AMOUNT OF RESERVE

MORPHOLOGICAL ANALYSIS RESULT :
/MAXIMUM (ADJECTIVE VERB) /RESERVE (SA-LINE IRREGULAR CONJUGATION) /AMOUNT (NOUN) /KNOW (VERB) / WOULD LIKE TO (AUXILIARY VERB)/

MODIFICATION ANALYSIS RESULT :
[MAXIMUM] [RESERVE] [THE AMOUNT] [WOULD LIKE TO KNOW]

F I G. 4

```
WHEN -> [WHEN (PRONOUN)]
WHAT -> [WHAT (ADVERB)]
HOW -> [HOW (ADVERB)]
THING -> [INTERNET BANKING (NOUN)]
PRICE -> [RESERVE(SA-LINE IRREGULAR CONJUGATION)] / [AMOUNT(NOUN)]
CONDITION -> [UPPER LIMIT(NOUN)]
KNOW -> [KNOW(VERB) WOULD LIKE TO (AUXILIARY VERB)]
DO -> [PROPOSE(VERB)]
DO -> [CANCEL(VERB)]
DO -> [SET(SA-LINE IRREGULAR CONJUGATION)]
EXIST -> [IS(VERB)]

REQUEST_STYLE -> PRICE/KNOW
HOW_Q_STYLE -> HOW/DO
WHEN_Q_STYLE -> WHEN/DO
WHAT_Q_STYLE -> THING/WHAT
YES_NO_Q_STYLE -> CONDITION/EXIST

PRICE_TOPIC -> PRICE/KNOW
PRICE_TOPIC -> PRICE/CONDITION
TIME_TOPIC -> HOW/DO
```

F I G. 5

[MAXIMUM] [RESERVE] [AMOUNT] [WOULD LIKE TO KNOW]

{ STYLE : REQUEST
  TOPIC : PRICE

F I G. 6

INPUTTED QUERY:
IS THERE UPPER LIMIT OF AMOUNT OF RESERVE ?

MORPHOLOGICAL ANALYSIS RESULT:
/RESERVE (SA-LINE IRREGULAR CONJUGATION) /AMOUNT (NOUN) /OF (PARTICLE) / UPPER LIMIT (NOUN)/IS (VERB)/

MODIFICATION ANALYSIS RESULT:
[RESERVE (SA-LINE IRREGULAR CONJUGATION)] [THE AMOUNT (NOUN) OF (PARTICLE)] [UPPER LIMIT (NOUN)] [IS (VERB)]

| QID | AID | QUERY |
|---|---|---|
| 1 | 1 | IS THERE UPPER LIMIT OF AMOUNT OF RESERVE ? |
| 2 | 2 | IS THERE UPPER LIMIT OF PERIOD OF RESERVE ? |
| 3 | 2 | HOW LONG COULD I MAKE DEPOSIT ? |
| ... | ... | ... |

| AID | ANSWER |
|---|---|
| 1 | THERE IS NO UPPER LIMIT OF AMOUNT OF RESERVE |
| 2 | YOU COULD MAKE DEPOSIT FOR 10 YEARS TO MAXIMUM EXTENT |
| ... | ... |

F I G. 9

| QID | STYLE | TOPIC | MORPHEME STRINGS |
|---|---|---|---|
| 1 | YES_NO_Q | PRICE | /RESERVE (SA-LINE IRREGULAR CONJUGATION) /AMOUNT (NOUN) /OF (PARTICLE) /UPPER LIMIT (NOUN) /IS (VERB) |
| 2 | YES_NO_Q | TIME | /RESERVE (SA-LINE IRREGULAR CONJUGATION) /PERIOD (NOUN) /OF (PARTICLE) /UPPER LIMIT (NOUN) /IS (VERB) |
| ... | ... | ... | ... |

F I G. 10

| QUESTION SENTENCE 1 | | QUESTION SENTENCE 2 | | MATCHING DEGREE |
|---|---|---|---|---|
| STYLE | TOPIC | STYLE | TOPIC | |
| A | B | A | B | 1.0 |
| HOW_Q | PRICE | WHAT_Q | PRICE | 0.9 |
| HOW_Q | PRICE | YES_NO_Q | PRICE | 0.9 |
| WHEN_Q | TIME | REQUEST | TIME | 0.9 |
| WHEN_Q | TIME | YES_NO_Q | TIME | 0.9 |
| WHAT_Q | PRICE | REQUEST | PRICE | 0.8 |
| YES_NO_Q | PRICE | REQUEST | PRICE | 0.8 |
| A | B | NOT A | B | 0.5 |
| ⋮ | ⋮ | ⋮ | ⋮ | ⋮ |
| A | B | NOT A | NOT B | |

QUESTION ANSWERING DEVICE, QUESTION ANSWERING METHOD, AND QUESTION ANSWERING PROGRAM

TECHNICAL FIELD

The present invention relates to a question-answering device, a question-answering method, and a question-answering program, and more particularly, to a question-answering device, a question-answering method, and a question-answering program that output an answer to an inputted query.

BACKGROUND ART

Conventionally, there has been proposed a retrieval system that receives a query and can output an answer to the query.

For example, an example of a similar document retrieval system, which uses a query as input, has been disclosed in Patent Document 1 (Japanese Patent Application Laid-Open No. 11-66086).

The similar document retrieval system includes a question input unit, a keyword dividing unit, a keyword similarity calculating unit, a threshold value setting unit, a highly similar document discriminating unit, a full similarity accumulating and sorting unit, and an answer output unit.

This similar document retrieval system is operated as follows.

The keyword dividing unit divides a keyword from a retrieval question inputted from the question input unit. The keyword similarity calculating unit calculates the similarity between each keyword and each object document to be searched. The highly similar document discriminating unit discriminates documents, which have similarity with a prepared threshold value or more, by using the calculated similarity. The full similarity accumulating and sorting unit accumulates the similarity of each document on the basis of all the discriminated documents. The answer output unit makes an answer of the summed-up similarity of each document.

Further, an example of a similar document retrieval system, which is to obtain information requested by a user with high accuracy, has been disclosed in Patent Document 2 (Japanese Patent Application Laid-Open No. 2004-139553).

The similar document retrieval system includes a query input unit, a retrieval keyword extracting unit, a retrieval keyword type assignment unit, a retrieval question type decision unit, a retrieval keyword classification unit, a keyword classification rule storage unit, a document retrieval unit, and an retrieval object document storage unit.

This similar document retrieval system is operated as follows.

The query input unit receives a query inputted by a user. The retrieval keyword extracting unit analyzes the inputted query to extract retrieval keywords. The retrieval keyword type assignment unit decides the type of each extracted retrieval keyword, and assigns a keyword type. The retrieval question type decision unit decides the question type.

The retrieval keyword classification unit classifies the retrieval keywords, to which the keyword types are assigned, into a major type and a minor type with reference to the question type and the keyword classification rules stored in the keyword classification rule storage unit. The document retrieval unit searches retrieval object documents stored in the object document storage unit by using the classified search keyword groups, and thus obtains the documents of the retrieved result.

Patent Document 1: Japanese Patent Application Laid-Open No. 11-66086
Patent Document 2: Japanese Patent Application Laid-Open No. 2004-139553

DISCLOSURE OF THE INVENTION

Problem to be Solved by the Invention

The problem of the related art is that an answer to a query may be buried in the search results.

The reason for this is that words not corresponding to the answer to the query are likely to be included in the search results due to the difference of the expression of the query even though the search results including keywords of the query are obtained.

[Exemplary Object of the Invention]

An exemplary object of the present invention is to provide a question-answering device, a question-answering method, and a question-answering program that can obtain an answer to an inputted query with high probability.

Means For Solving The Problem

In order to achieve the above-mentioned exemplary object, according to an exemplary embodiment of the present invention, a question-answering device includes a question-answer pair storing means that stores a plurality of question-answer pairs composed of reference queries and their answers, an analysis result storing means that stores groups of a style representing the type of a question of each reference query and a topic of each reference query, an input means that receives a query, an analysis pattern storing means that stores a rule used to decide the groups of the style and the topic of the query received in the input means, an analysis means that decides the groups of the style and the topic of the query received in the input means on the basis of the rule stored in the analysis pattern storing means, a determination means that determines a matching degree between each group of the style and the topic of the reference query stored in the analysis result storing means and the group of the style and the topic of the query decided by the analysis means, and a narrowing means that narrows search results of the query received in the input means from the plurality of question-answer pairs stored in the question-answer pair storing means on the basis of the matching degree determined by the determination means.

Further, according to another exemplary embodiment of the present invention, a question-answering method performed by a question-answering device, includes an input step of receiving a query, an analysis step of deciding the groups of the style and the topic of the query on the basis of the rule stored in an analysis pattern storing means, a determination step of determining a matching degree between each group of the style and the topic of the reference query stored in an analysis result storing means and the group of the style and the topic of the query, and a narrowing step of narrowing search results of the query from a plurality of question-answer pairs stored in a question-answer pair storing means on the basis of the matching degree, wherein the question-answering device includes the question-answer pair storing means that stores the plurality of question-answer pairs composed of reference queries and their answers, the analysis result storing means that stores groups of the style representing the type of the question of each reference query and the topic of each reference query, and the analysis pattern storing means that stores a rule used to decide the groups of the style and the topic of the query.

According to the exemplary embodiments of the present invention, a matching degree between the inputted query and the reference query is determined on the basis of a matching degree of the groups of the style and the topic where question contents is likely to be reflected, as well as the matching of the keyword in the related art.

For this reason, it is possible to provide a high matching degree to a reference query of which the expression is different from that of the inputted query but the content is similar to that of the inputted query. Further, the question-answer pairs are narrowed on the basis of the matching degree. Therefore, it is possible to obtain an answer to the inputted query with high probability.

Meanwhile, the question-answering device may further include a retrieval means that extracts a keyword from the query received in the input means, and performs a keyword search on the plurality of question-answer pairs stored in the question-answer pair storing means as search objects by using the extracted keyword, wherein the determination means may read out the groups of the style and the topic of each reference query, which is included in the search results of the retrieval means, from the analysis result storing means, and determine a matching degree between each group of the style and the topic of the read-out reference query and the group of the style and the topic of the query decided in the analysis means.

According to the exemplary embodiment of the present invention, first, the candidates of an answer to the inputted query are narrowed in the keyword search, and the narrowed candidates are then narrowed on the basis of the matching degree of the groups of the style and the topic of the query.

Accordingly, it is possible to narrow the results of the keyword search into the answer to the inputted query.

Further, the question-answering device may further include a question-content matching degree table storing means that stores a question-content matching degree table showing the matching degree between two groups of the styles and the topics, wherein the determination means may determine a matching degree between each group of the style and the topic of the reference query and the group of the style and the topic of the query decided in the analysis means, by using the question-content matching degree table.

According to the exemplary embodiment of the present invention, a matching degree between the groups of the styles and the topics of both queries is determined by the question-content matching degree table. Accordingly, it is possible to simplify a matching determination process as compared to when the matching degree between the groups of the styles and the topics of both queries is calculated by an arithmetic calculation.

Furthermore, the determination means may calculate a score that represents a matching degree between a keyword of the query received in the input means and a keyword of each question-answer pairs. The narrowing means may narrow the search results of the query received by the input means from the plurality of question-answer pairs stored in the question-answer pair storing means, on the basis of the score calculated in the determination means and the matching degree determined in the determination means.

According to the exemplary embodiment of the present invention, it is possible to obtain an answer to the inputted query with higher probability.

In addition, according to another exemplary embodiment of the present invention, a question-answering program performs a question-answering process in a computer, the computer being connected to a question-answer pair storing means that stores a plurality of question-answer pairs composed of reference queries and their answers, an analysis result storing means that stores groups of a style representing the type of a question of each reference query and a topic of each reference query, and an analysis pattern storing means that stores a rule used to decide the groups of the style and the topic of the query, wherein the question-answering process includes an input process for receiving a query, an analysis process for deciding the groups of the style and the topic of the query on the basis of the rule stored in the analysis pattern storing means, a determination process for determining a matching degree between each group of the style and the topic of the reference query stored in the analysis result storing means and the group of the style and the topic of the query, and a narrowing process for narrowing search results of the query from the plurality of question-answer pairs stored in the question-answer pair storing means on the basis of the matching degree.

According to the exemplary embodiment of the present invention, it is possible to perform the question-answering method by a computer.

EFFECT OF THE INVENTION

According to the present invention, it is possible to obtain an answer to the inputted query with high probability.

BEST MODE FOR CARRYING OUT THE INVENTION

Exemplary embodiments of the present invention will be described in detail below with reference to the drawings.

Figure 1:
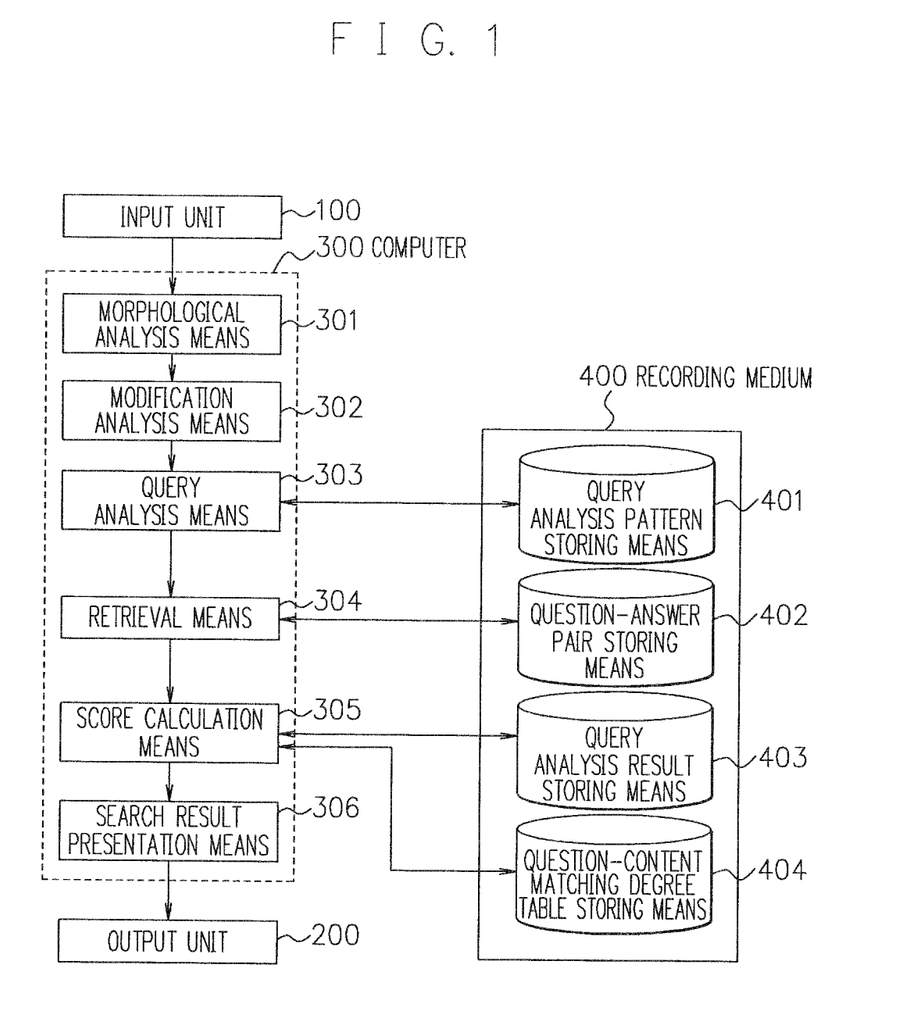
FIG. 1 is a block diagram of a question-answer pair retrieval device according to an exemplary embodiment of the present invention.

FIG. 1 is a block diagram of a question-answer pair retrieval device according to an exemplary embodiment of the present invention.

In FIG. 1, the question-answer pair retrieval device includes an input unit (input means) 100, an output unit 200, a computer 300 operated by program control (for example, a central processing unit, a processor, or a data processing unit), and a recording medium 400.

The computer 300 includes a morphological analysis means (input means) 301, a modification analysis means 302, a query analysis means (analysis means) 303, a retrieval means 304, a score calculation means (determination means) 305, and a search result presentation means (narrowing means) 306.

The computer 300 may prosecute the morphological analysis means 301, the modification analysis means 302, the query analysis means 303, the retrieval means 304, the score calculation means 305, and the search result presentation means 306 by executing, for example, programs.

The recording medium 400 includes a query analysis pattern storing means 401, a question-answer pair storing means 402, a query analysis result storing means 403, and a question-content matching degree table storing means 404.

These are substantially operated as follows.

The input unit 100 receives a query, and outputs the query to the computer 300 (specifically, the morphological analysis means 301). Hereinafter, the query received by the input unit 100 is referred to as an "inputted query".

The output unit 200 outputs (for example, displays or prints) an answer to the inputted query, which is outputted from the computer 300 (specifically, the search result presentation means 306).

The query analysis pattern storing means 401 stores a query analysis pattern (rule) that is used to decide groups of the question style (hereinafter, simply referred to as a "style") and the topic of the inputted query. Meanwhile, the style represents the type of a question of the query.

The question-answer pair storing means 402 stores a plurality of question-answer pairs composed of reference queries and their answers.

The query analysis result storing means 403 stores query analysis results. The query analysis results correspond to the groups of the style representing the type of a question of each reference query and the topic of each reference query, and the information on morpheme strings of each reference query.

The question-content matching degree table storing means 404 stores a question-content matching degree table that shows the matching degree between two groups of the styles and the topics. Specifically, the question-content matching degree table provides a matching degree between the question contents of two queries on the basis of the combination of the groups of each style and topic of two queries.

The morphological analysis means 301 performs a morphological analysis process on the inputted query received from the input unit 100, and outputs morpheme strings, which are obtained by dividing the inputted query into morphemes, to the modification analysis means 302 as morpheme strings of the inputted query together with the word class information of each morpheme.

The modification analysis means 302 performs a modification analysis process on the inputted morpheme strings, and outputs the modification structure of the morpheme strings to the query analysis means 303.

The query analysis means 303 applies the query analysis pattern, which is stored in the query analysis pattern storing means 401, to the modification structure of the inputted query and thus obtains the groups of the style and the topic of the inputted query. Then, the query analysis means 303 outputs the groups of the style and the topic of the inputted query and the morpheme strings of the inputted query to the retrieval means 304.

The retrieval means 304 uses the groups of the style and the topic of the inputted query and the morpheme strings as input, and extracts text search keyword strings from the morpheme strings of the input.

The retrieval means 304 performs a keyword search on the question-answer pairs as an object, which are previously stored in the question-answer pair storing means 402, by using the keyword. The retrieval means 304 uses a plurality of retrieved question-answer pairs as search candidates, and outputs the search candidates to the score calculation means 305 together with the groups of the style and the topic of the inputted query question sentence and the morpheme strings.

The score calculation means 305 uses the morpheme strings of the inputted query, the groups of the style and the topic of the inputted query, and the search candidates as input. First, the score calculation means 305 acquires the groups of the style and the topic of the reference query of each question-answer pair, which is included in the search candidates, from the query analysis result storing means 403.

Further, with reference to the question-content matching degree table stored in the question-content matching degree table storing means 404, the score calculation means 305 evaluates a matching degree between the inputted query and each reference query from a correspondence relationship between the groups of the style and the topic of the inputted query and the groups of the style and the topic of each reference query included in the search candidates.

Furthermore, the score calculation means 305 calculates a score of the keyword search of the answer and the reference query included in the search candidates. Meanwhile, the score is increased as much as the matching degree with the keyword extracted from the inputted query is increased.

In addition, the score calculation means 305 outputs each question-answer pair of the search candidates to the search result presentation means 306 together with a search score that is obtained from the combination of the score and the matching degree between the inputted query and each reference query.

The search result presentation means 306 ranks the search candidates received from the score calculation means 305 in order of the search scores, narrows the search candidates into only candidates having high search scores, and outputs the question-answer pairs of the narrowed search candidates as search results.

Figure 2:
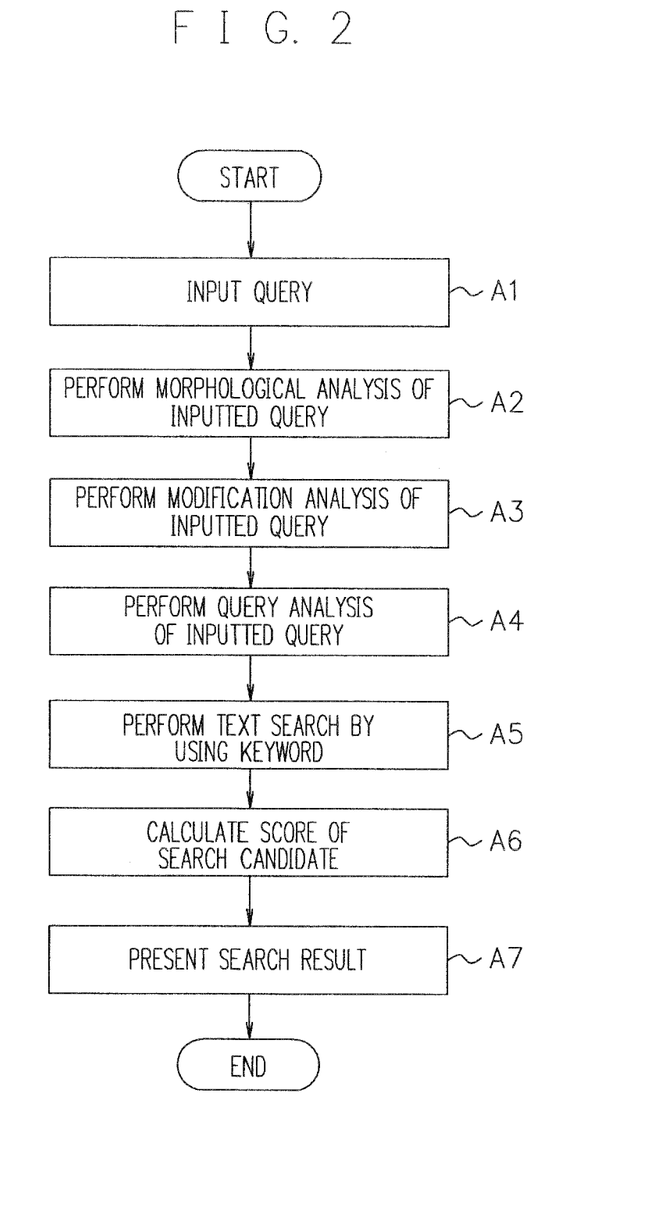
FIG. 2 is a flowchart illustrating an operation of the question-answer pair retrieval device according to the exemplary embodiment of the present invention.

FIG. 2 is a flowchart illustrating an operation of the question-answer pair retrieval device.

The entire operation of the question-answer pair retrieval device according to the exemplary embodiment will be described in detail below with reference to FIGS. 1 and 2.

First, if the query is inputted to the input unit 100, the input unit 100 sends the inputted query to the morphological analysis means 301 (Step A1).

Then, the morphological analysis means 301 receives the inputted query; performs a morphological analysis on the inputted query; and sends the morpheme strings of the inputted query, which are divided into morphemes, to the modification analysis means 302 as the morpheme strings of the inputted query together with the word class information of each morpheme (Step A2).

After that, the modification analysis means 302 performs a modification analysis process on the inputted morpheme strings, and sends the modification structure of the morpheme strings to the query analysis means 303 (Step A3).

Subsequently, the query analysis means 303 applies the query analysis pattern, which is stored in the question sentence analysis pattern storing means 401, to the modification structure of the inputted query and thus obtains the groups of the style and the topic of the inputted query; and sends the groups of the style and the topic of the inputted query and the morpheme strings of the inputted query to the retrieval means 304 (Step A4).

Then, the retrieval means 304 uses the groups of the style and the topic of the inputted query and the morpheme strings as input, and generates text search keyword strings from the morpheme strings of the input.

Subsequently, the retrieval means 304 performs a keyword search on the question-answer pairs as an object, which are previously stored in the question-answer pair storing means 402, by using the text search keyword strings; uses the question-answer pairs including the keywords as search candidates; and outputs the search candidates to the score calculation means 305 together with the groups of the style and the topic of the inputted query and the morpheme strings (Step A5).

After that, the score calculation means 305 uses the morpheme strings of the inputted query, the groups of the style and the topic of the inputted query, and the search candidates as inputs; and acquires the groups of the style and the topic of the reference query of each question-answer pair, which is included in the search candidates of the input, from the query analysis results stored in the query analysis result storing means 403.

Subsequently, the score calculation means 305 evaluates a matching degree between the contents of the inputted query and each reference query, from a correspondence relationship between the groups of the styles and the topics of the inputted query and each reference query of the search candidates, on the basis of the question-content matching degree table stored in the question-content matching degree table storing means 404.

In addition, the score calculation means 305 calculate a score of the keyword search of the answer and the reference query of the search candidates. The score calculation means 305 outputs each question-answer pair of the search candidates to the search result presentation means 306 together with a search score that is obtained from the combination of the score of the keyword search and the matching degree of the content of the query (Step A6).

Finally, the search result presentation means 306 ranks the search candidates in order of the search scores on the basis of each question-answer pair of the inputted search candidate and the search score thereof, narrows the question-answer pairs of the search candidates into only candidates having high search scores, and outputs the question-answer pairs of the narrowed search candidates as search results (Step A7).

Next, advantages of the exemplary embodiment will be described below.

In the exemplary embodiment, the query analysis means 303 applies the query analysis pattern, and thus obtains the groups of the style and the topic of the inputted query.

Further, the score calculation means 305 evaluates a matching degree of the content of the query from a correspondence relationship between the groups of the styles and the topics of the inputted query and the reference queries of the search candidates, on the basis of the question-content matching degree table stored in the question-content matching degree table storing means 404.

Furthermore, the score calculation means 305 calculates a score of the keyword search of the answer and the query of the search candidates, and then calculates the search score that is obtained from the combination of the score of the keyword search and the matching degree of the content of the query.

In addition, the search result presentation means 306 ranks the question-answer pairs of the search candidates in order of the search scores, narrows the question-answer pairs of the search candidates into top candidates of the search candidates, and generates the narrowed results thereof as search results.

For this reason, it is possible to present search results while narrowing the question-answer pairs being answers of the inputted query.

EXAMPLES

The operation of the question-answer pair retrieval device according to the exemplary embodiment of the present invention will be described below using a specific example.

Figure 3:
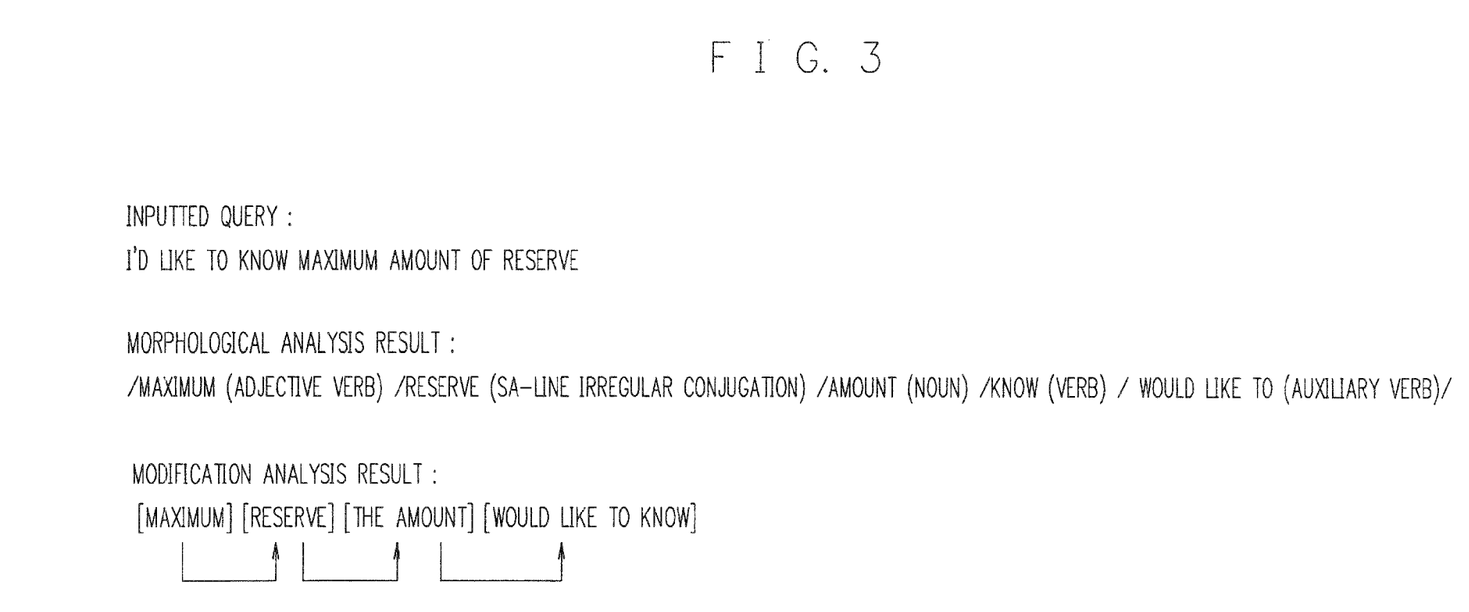
FIG. 3 is a view illustrating specific examples of an inputted query, a morphological analysis result, and a modification analysis result.

FIG. 3 is a view illustrating examples of an inputted query, a morphological analysis result thereof, and a modification analysis result thereof.

First, a query of "I'd like to know the maximum amount of reserve" (see FIG. 3) is inputted to the input unit 100, the input unit 100 sends the inputted query to the morphological analysis means 301 (Step A1).

Then, the morphological analysis means 301 performs a morphological analysis on the inputted query; and sends the morpheme strings (see FIG. 3) of the inputted query, which is divided into morphemes, to the modification analysis means 302 as the morpheme strings of the inputted query together with the word class information of each morpheme (Step A2).

After that, the modification analysis means 302 performs a modification analysis process on the inputted morpheme strings (see FIG. 3), and sends the modification structure (see FIG. 3) of the morpheme strings to the query analysis means 303 (Step A3).

Subsequently, the query analysis means 303 applies the query analysis pattern, which is stored in the query analysis pattern storing means 401, to the modification structure (see FIG. 3) of the inputted query; and obtains the analysis results of the inputted query, that is, the style and the topic of the inputted query.

In this example, REQUEST, HOW_Q, WHEN_Q, WHAT_Q, and YES_NO_Q are used as the styles.

The REQUEST represents the type of a question that transmits a request (for example, "I'd like to cancel a deposit account").

The HOW_Q represents the type of a question about the means and method (for example, "How should I set it?").

The WHEN_Q represents the type of a question about time (for example, "When should I propose it?").

The WHAT_Q represents the type of a question about a matters and meaning (for example, "What kind of service is Internet banking?").

The YES_NO_Q represents the type of a question that is answered by "YES/NO" (for example, "Is there any upper limit of the amount of reserve?").

Further, in this example, PRICE and TIME are used as the topics of the question.

The PRICE represents the amount of money (for example, "the amount of reserve"), and the TIME represents time (for example, the "time of proposal").

Figure 4:
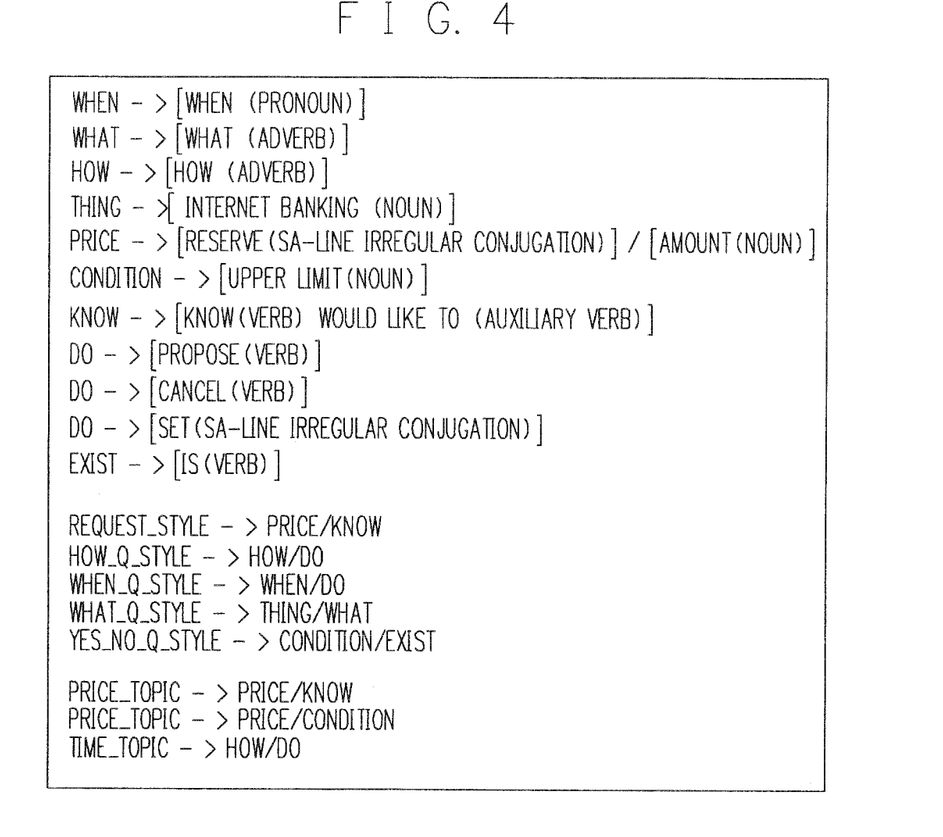
FIG. 4 is a view illustrating a specific example of a query analysis pattern.

FIG. 4 is a view illustrating an example of a query analysis pattern, which is used to decide the style and the topic.

Figure 5:
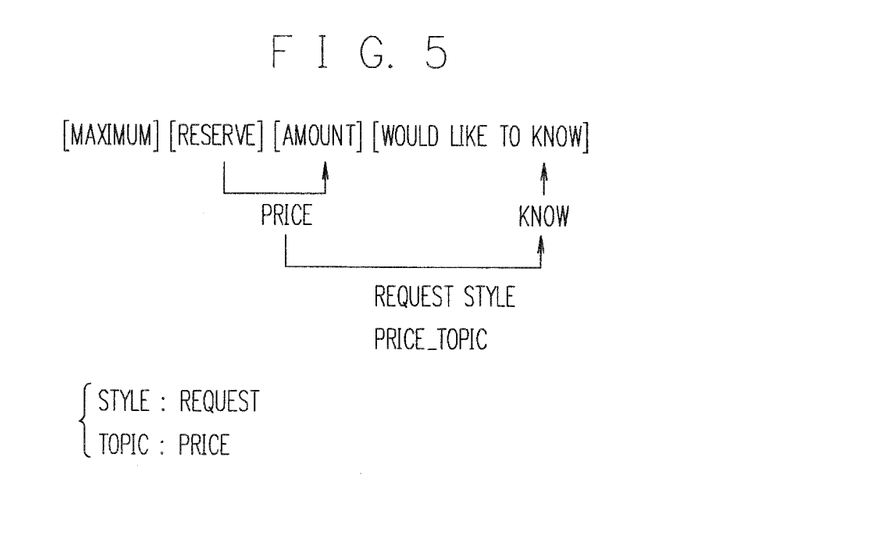
FIG. 5 is a view illustrating specific examples of query analysis results.

Further, FIG. 5 is a view illustrating query analysis results (style and topic) when the query analysis pattern shown in FIG. 4 is applied to the modification structure of the query shown in FIG. 3.

The detailed operation of the query analysis means 303 will be described hereinafter.

Figure 6:
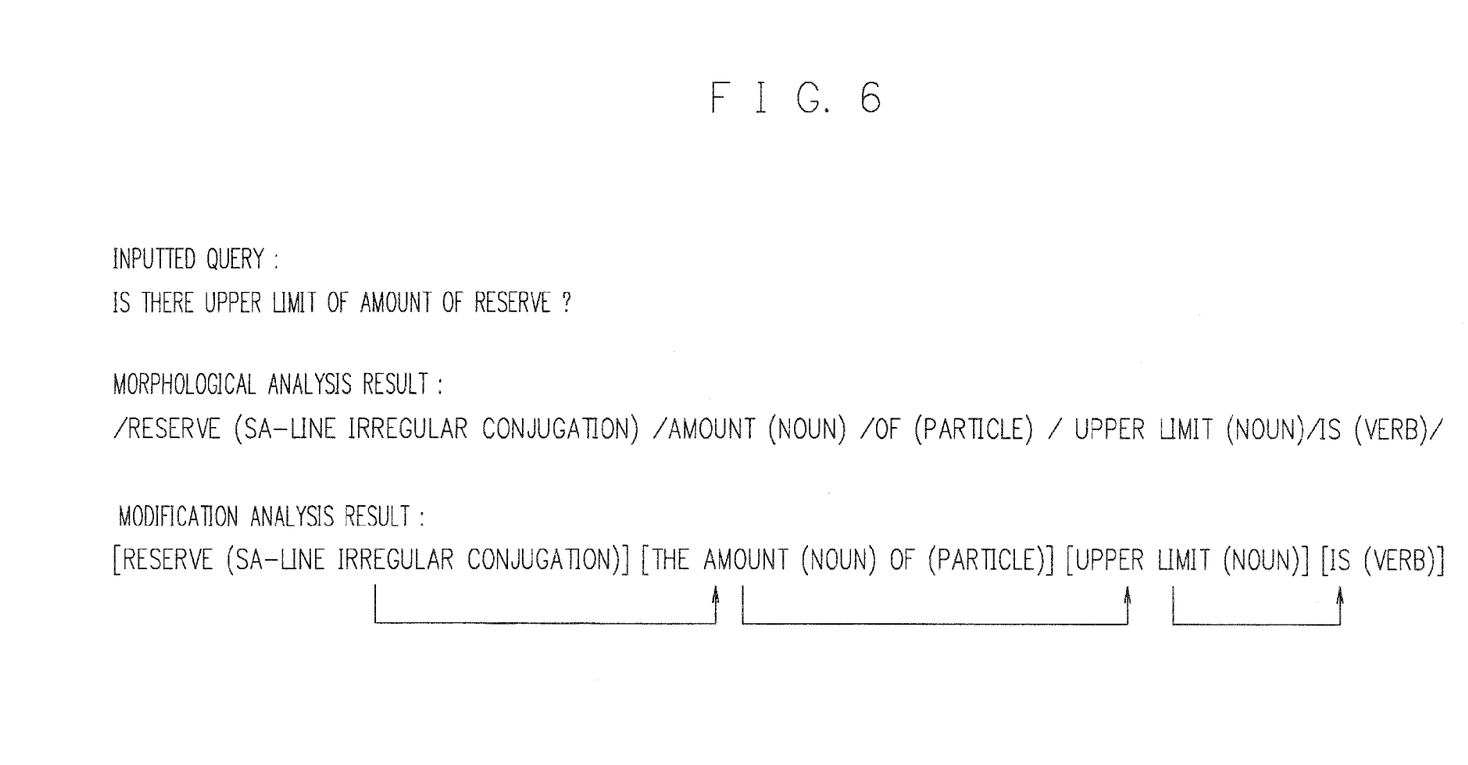
FIG. 6 is a view illustrating other examples of an inputted query, a morphological analysis result, and a modification analysis result.

For example, if an inputted query is "Is there the upper limit of the amount of reserve?" shown in FIG. 6, the morphological analysis means 301 performs a morphological analysis process on the inputted query and thus obtains the morphological analysis results shown in FIG. 6 (Step A2).

Then, the modification analysis means 302 uses the morphological analysis results as input and performs a modification analysis, thereby obtaining the modification analysis results shown in FIG. 6 (Step A3).

Figure 7:
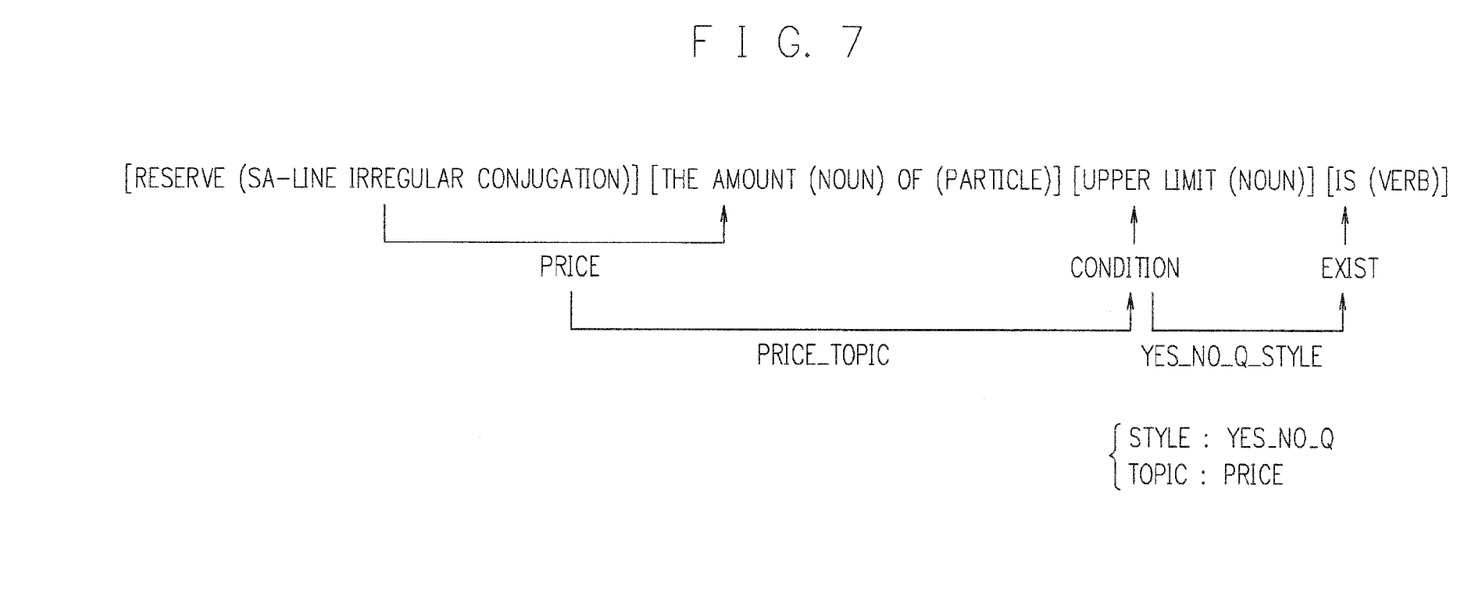
FIG. 7 is a view illustrating other examples of query analysis results.

After that, the query analysis means 303 applies the query analysis pattern shown in FIG. 4 to the modification analysis results, and thus obtains the question analysis results (style and topic) shown in FIG. 7.

A process performed until the query analysis means 303 obtains the question analysis results (style and topic) shown in FIG. 7 will be described in detail hereinafter.

First, the query analysis means 303 applies "PRICE-> [reserve (Sa-line irregular conjugation)]/[amount (noun)]" (see FIG. 4) of the query analysis pattern to the "[reserve]-> [the amount of]" (see FIG. 6) of the modification analysis results (in this case, "/" on the right side of the pattern means that two words on the front and rear sides thereof, that is, "[reserve (Sa-line irregular conjugation)]" and "[amount (noun)]" are in a modification relationship).

The query analysis means 303 provides "PRICE" to parent nodes of "[reserve (Sa-line irregular conjugation)][the amount (noun) of (particle)]" of the modification analysis results shown in FIG. 7, by applying the pattern (see FIG. 7).

Likewise, the query analysis means 303 applies "CONDITION->[upper limit (noun)]" (see FIG. 4) of the query analysis pattern to the "[upper limit (noun)]" (see FIG. 6), and provides "CONDITION" to a parent node of "[upper limit (noun)]" (see FIG. 7).

Further, the query analysis means 303 applies "EXIST->[Is (verb)]" (see FIG. 4) of the query analysis pattern to "[Is (verb) ~?]" (see FIG. 6), and provides "EXIST" to a parent node of "[Is (verb) ~?]" (see FIG. 7).

In this case, since there is modification of "[(particle) of the amount (noun)]->[upper limit (noun)]" (see FIG. 6), the query analysis means 303 also generate a modification relationship of "PRICE->CONDITION" between the parent nodes (see FIG. 7).

The query analysis means 303 applies "PRICE_TOPIC->PRICE/CONDITION" (see FIG. 4) of the query analysis pattern to the modification relationship, and provides "PRICE_TOPIC" to parent nodes of "[reserve (Sa-line irregular conjugation)][the amount (noun) of (particle)][upper limit (noun)]" (see FIG. 7).

Further, in this case, since there is modification of "[upper limit (noun)]->[Is (verb) ~?]" (see FIG. 6), the query analysis means 303 also generate a modification relationship of "CONDITION->EXIST" between the parent nodes (see FIG. 7).

The query analysis means 303 applies "YES_NO_Q_STYLE->CONDITION/EXIST" (see FIG. 4) of the query analysis pattern to the modification relationship, and provides "YES_NO_Q-STYLE" to parent nodes of "[upper limit (noun)][Is (verb) ~?]" (see FIG. 7).

In this way, the query analysis means 303 obtains the question analysis results shown in FIG. 7.

The query analysis means 303 determines that the style of the inputted query is "YES_NO_Q" and the topic thereof is "PRICE", from the "YES_NO_Q_STYLE" and "PRICE_TOPIC" of these results that are provided to the nodes, and then outputs the determination results to the retrieval means 304 (Step A4).

After that, the retrieval means 304 uses the groups of the styles and the topics of the inputted query (hereinafter, referred to as groups of FIG. 5) and the morpheme strings (hereinafter, referred to as FIG. 3) as input, and generates a text search keyword string of "the maximum, amount, reserve, know" from the morpheme strings of the input.

In this example, the retrieval means 304 generates keyword strings by extracting independent words from the morpheme strings. Alternatively, the retrieval means 304 may generate a keyword by using various keyword generating technologies of text search such as synonym expansion of a keyword.

Then, the retrieval means 304 performs a keyword search on the question-answer pairs as an object, which are previously stored in the question-answer pair storing means 402, by using the keyword.

Figure 8:
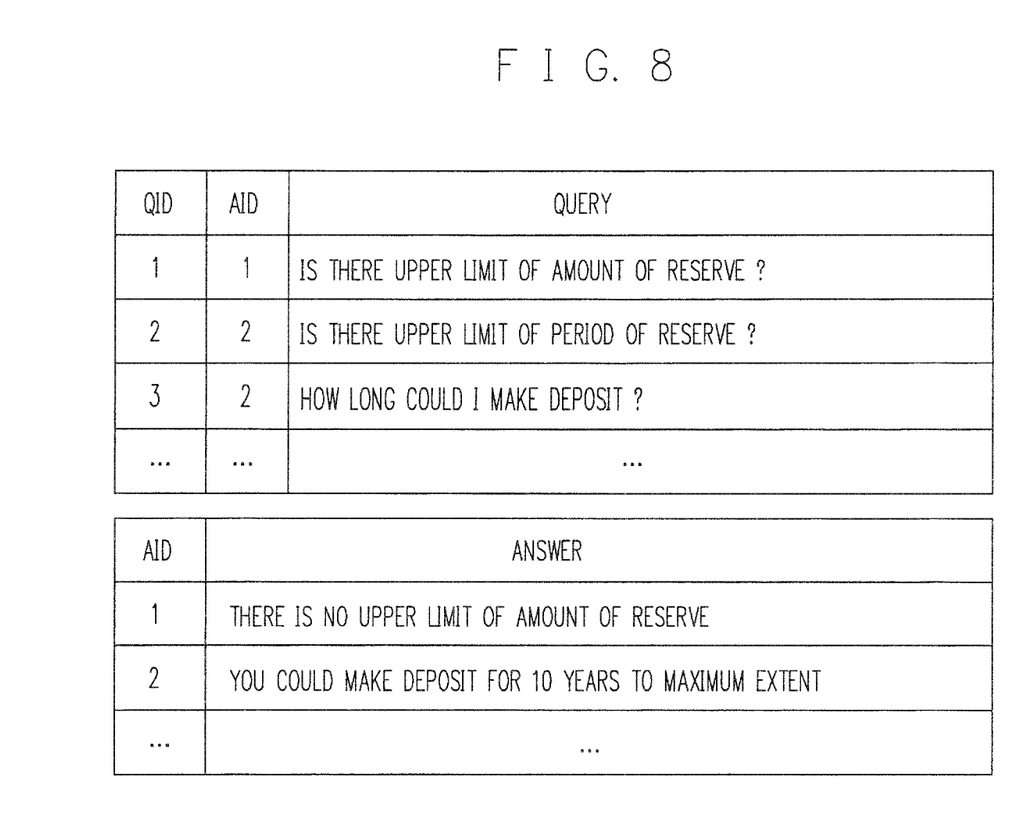
FIG. 8 is a view illustrating specific examples of question-answer p airs.

FIG. 8 is a view illustrating an example of question-answer pairs previously stored in the question-answer pair storing means 402.

As a result of the search, a question sentence QID=1 and 2 and an answer sentence AID=1 and 2, which include the keyword extracted by the retrieval means 304, are searched out.

In this case, the retrieval means 304 uses the question-answer pairs (QID,AID)=(1,1),(2,2) as search candidates; and outputs the morpheme strings of the inputted query, the groups of the style and the topic of the inputted query, and the search candidates to the score calculation means 305 (Step A5).

Then, the score calculation means 305 uses the morpheme strings of the inputted query (see FIG. 3), the groups of the style and the topic of the inputted query (style=REQUEST and topic=PRICE), and the question-answer pairs (QID, AID)=(1,1),(2,2), which are the search candidates, as input; and acquires the groups of the style and the topic of the reference query (reference query of QID=1 and 2) of each question-answer pair of the search candidates of the input, from the query analysis results stored in the query analysis result storing means 403.

Figure 9:
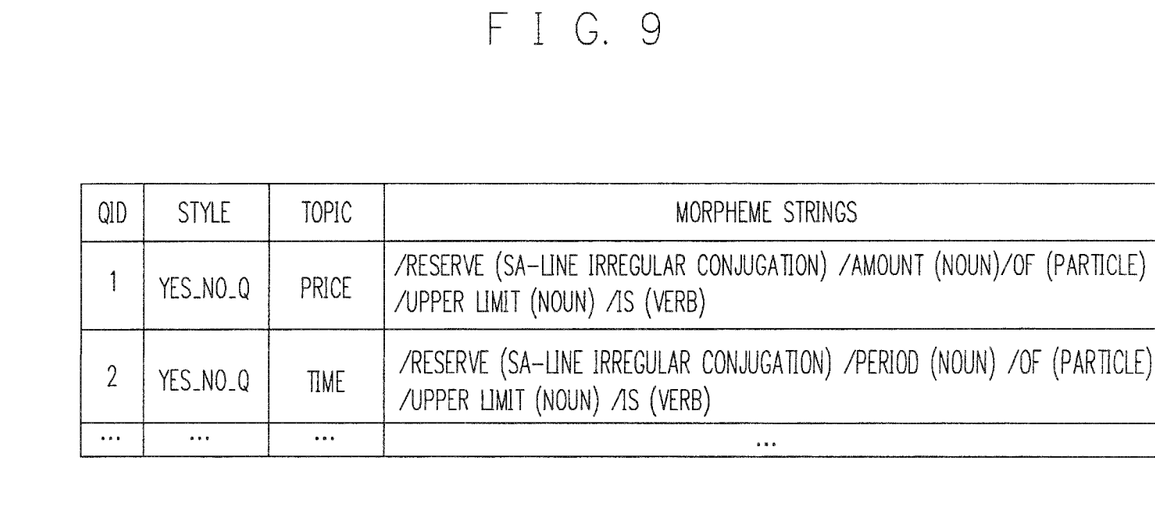
FIG. 9 is a view illustrating specific examples of reference query analysis results.

FIG. 9 is a view illustrating an example of the query analysis result stored in the query analysis result storing means 403.

As a result, the groups of the style and the topic of the inputted query, and the groups of the style and the topic of the reference query of QID=1 and QID=2 of the search candidates will be described below.

Style=REQUEST and topic=PRICE are satisfied in the inputted query, style=YES_NO_Q and topic=PRICE are satisfied in the query (QID=1), and style=YES_NO_Q and topic=TIME are satisfied in the query (QID=2).

The score calculation means 305 evaluates a matching degree between the question contents of the inputted query and the reference query (QID=1) and a matching degree between the question contents of the inputted query and the reference query (QID=2) from them on the basis of the question-content matching degree table stored in the question-content matching degree table storing means 404.

Figure 10:
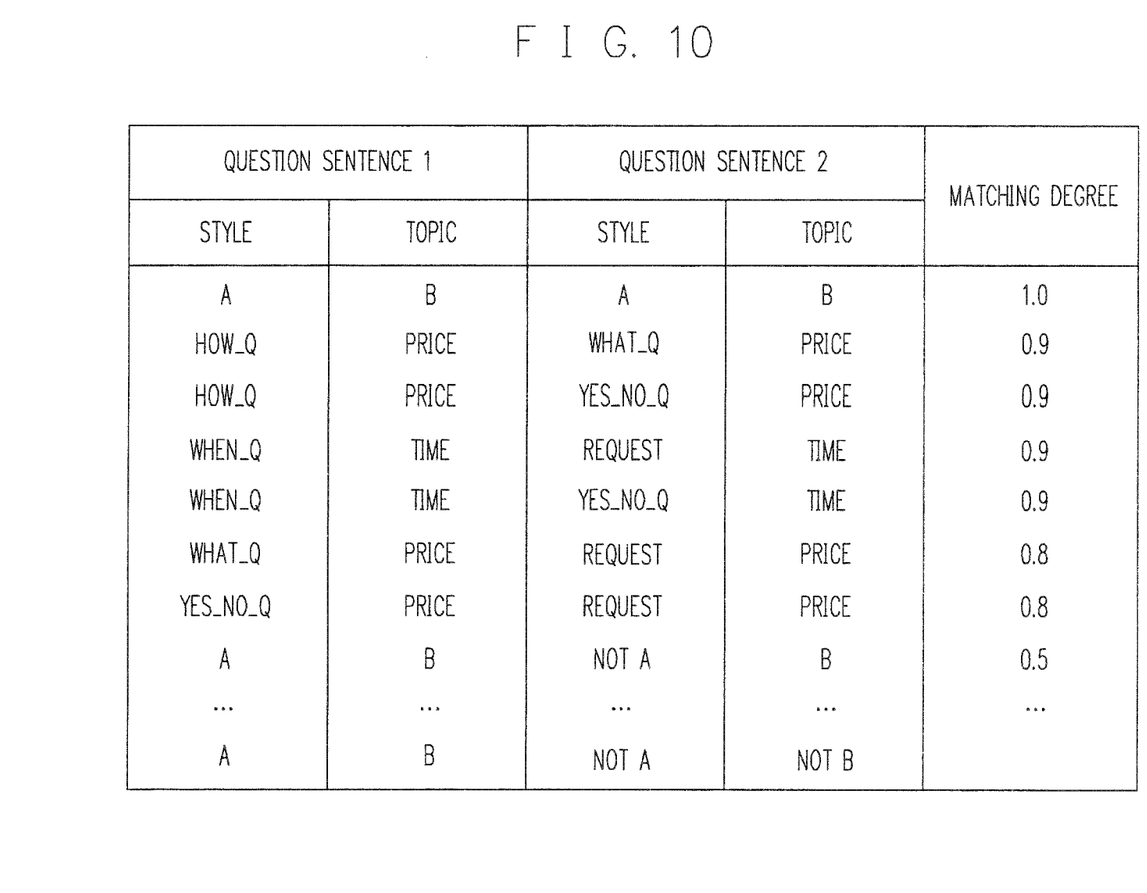
FIG. 10 is a view illustrating a specific example of a question-content matching degree table.

FIG. 10 is a view illustrating an example of the question-content matching degree table.

On the basis of the question-content matching degree table shown in FIG. 10, the score calculation means 305 evaluates a matching degree between the question contents of the inputted query (style=REQUEST and topic=PRICE) and the query (QID=1) (style=YES_NO_Q and topic=PRICE) as 0.8, and evaluates a matching degree between the question contents of the inputted query and the query (QID=2) as, for example, 0.2.

Further, the score calculation means 305 calculates a search score, which is obtained using the keyword extracted from the inputted query, for each of the reference query and the answer by a TF·IDF method or the like.

For example, if a value of IDF corresponding to each keyword satisfies "IDF (reserve (Sa-line irregular conjugation))=2.0 and IDF (amount (noun))=0.5", the TF·IDFs of the reference query (QID=1), the reference query (QID=2), the answer (AID=1), and the answer (AID=2) are obtained as TF·IDF (QID=1)=2.5, TF·IDF (QID=2)=2.0, TF·IDF (AID=1)=2.5, and TF·IDF (AID=2)=2.0, respectively.

Then, the score calculation means 305 obtains a search score, which considers the matching of the question contents, on the basis of Formula 1 that is a search score calculation formula using the matching degree of the question contents and the value of TF·IDF.

Meanwhile, Formula 1 is as follows:

Formula 1=search score(inputted query, search candidate)=Matching degree(style of inputted query, topic of inputted query: style of reference query of search candidate, topic of reference question sentence of search candidate)×$TF \cdot IDF$(reference query of search candidate)+$\alpha \times TF \cdot IDF$(answer of search candidate)

For example, if the score calculation means 305 calculates a search score when $\alpha=0.2$, search score of question-answer pairs (QID=1,AID=1)=0.8×2.5+0.2×2.5=2.5 is satisfied. Further, search score of question-answer pairs (QID=2, AID=2)=0.2×2.0+0.2×2.0=0.8 is satisfied.

The score calculation means 305 outputs each of the question-answer pairs (QID,AID)=(1,1),(2,2) of the search candidates and each of the search scores 2.5 and 0.8 to the search result presentation means 306 (Step A6).

Finally, the search result presentation means 306 ranks the question-answer pairs of the search candidates in descending order of the search scores on the basis of each of the question-answer pairs of the inputted search candidate and the search scores, and narrows the question-answer pairs of the search candidates into only candidates having high search scores.

For example, when the search candidates having the maximum search score of 50% or more are narrowed, 0.8 of search score of the question-answer pairs (QID=2,AID=2) is less than 50% of 2.5 of the search score of the question-answer pairs(QID=1,AID=1). Therefore, the search result presentation means 306 narrows the search candidates into only question-answer pairs (QID=1,AID=1).

Finally, the search result presentation means 306 outputs the question-answer pairs (QID=1,AID=1) as the search results of the inputted query (Step A7).

In this case, if the search score is calculated by, for example, only the TF·IDF method (represented by the following Formula 2) in the related art, the search scores of the question-answer pairs (QID=1,AID=1) and the question-answer pairs (QID=2,AID=2) are 5.0 and 4.0 respectively, which do not make much difference from each other. Therefore, it is not possible to obtain an advantage of this example, that is, narrowing of the search results.

Search score(inputted query, search candidate)=
TF·IDF(query of search candidate)+
TF·IDF(answer of search candidate)    Formula 2

According to this example, the score calculation means 305 determines a matching degree between the group of the style and the topic of the inputted query and the group of the style and the topic of the query of the question-answer pairs. The search result presentation means 306 narrows the question-answer pairs on the basis of the matching degree.

Accordingly, in this example, a matching degree between the inputted query and the reference query is determined on the basis of a matching degree of the groups of the style and the topic where question contents are likely to be reflected, as well as the matching of the keyword in the related art.

For this reason, it is possible to provide a high matching degree to a reference query of which the expression is different from that of the inputted query but the content is similar to that of the inputted query. Further, since the question-answer pairs are narrowed on the basis of the matching degree, it is possible to obtain an answer to the inputted query with high probability.

Further, in this example, the retrieval means 304 performs a keyword search on the question-answer pairs as an object, which are previously stored in the question-answer pair storing means 402, by using the keyword extracted from the inputted query. The score calculation means 305 determines a matching degree between the group of the style and the topic of the inputted query, and each group of the style and the topic of the queries of the question-answer pairs included in the search results of the retrieval means 304.

In this case, first, the candidates of an answer to the inputted query are narrowed in the keyword search, and the narrowed candidates are then narrowed on the basis of the matching degree of the groups of the style and the topic of the query. Accordingly, it is possible to narrow the results of the keyword search into the answer to the inputted query.

Further, in this example, the score calculation means 305 determines a matching degree between each group of the style and the topic of the reference query and the group of the style and the topic of the inputted query by using the question-content matching degree table.

In this case, it is possible to simplify a matching determination process as compared to a case where the matching degree between the groups of the styles and the topics of both queries is calculated by an arithmetic calculation.

Furthermore, in this example, the score calculation means 305 calculates a score that represents a matching degree between a keyword of the inputted query and a keyword of each of the question-answer pairs. The search result presentation means 306 narrows the search results of the inputted query from the plurality of question-answer pairs stored in the question-answer pair storing means 402, on the basis of the score calculated by the score calculation means 305 and the matching degree determined by the score calculation means 305.

In this case, it is possible to obtain an answer to the inputted query with higher probability.

The structure shown in the above-mentioned exemplary embodiment is merely illustrative, and the present invention is not limited to the structure.

Meanwhile, this example may be applied to search question-answer history or FAQ of operator business at a contact center. Further, this example may also be applied to a retrieval system of FAQ such as a FAQ portal site released on the Internet.

Description Of Reference Numeral
   100 INPUT UNIT
   200 OUTPUT UNIT
   300 COMPUTER (CENTRAL PROCESSING UNIT; PROCESSOR; DATA PROCESSING UNIT)
     301 Morphological Analysis Means
     302 MODIFICATION ANALYSIS MEANS
     303 QUERY ANALYSIS MEANS
     304 RETRIEVAL MEANS
     305 SCORE CALCULATION MEANS
     306 SEARCH RESULT PRESENTATION MEANS
   400 RECORDING MEDIUM
     401 QUERY ANALYSIS PATTERN STORING MEANS
     402 QUESTION-ANSWER PAIR STORING MEANS 403 QUERY ANALYSIS RESULT STORING MEANS
404 QUESTION-CONTENT MATCHING DEGREE TABLE STORING MEANS

The invention claimed is:
1. A question-answering device comprising:
a question-answer pair storing unit that stores a plurality of question-answer pairs composed of reference queries and their answers;
an analysis result storing unit that stores groups of a style representing the type of a question of each reference query of said reference queries and a topic representing an object of a question of each reference query;
an input unit that receives a query;
an analysis pattern storing unit that stores a rule used to decide groups of a style and a topic of the query received in the input unit;
an analysis unit that obtains the style and the topic from the query by analyzing the query received in the input unit on a basis of the rule stored in the analysis pattern storing unit, and decides the groups of the style and the topic of the query;
a calculation unit that determines a matching degree between each group of the style and the topic of each reference query stored in the analysis result storing unit and each group of the style and the topic of the query received in the input unit decided by the analysis unit, and
calculates a search score based on the matching degree and information about a frequency of appearance of a keyword in the query received in the input unit in each reference query and each reference query's answer; and
a narrowing unit that narrows search results of the query received in the input unit from the plurality of question-answer pairs stored in the question-answer pair storing unit into only question-answer pairs, of which the question contents match the query received in the input unit, on a basis of the search score calculated by the calculation unit,
wherein the calculation unit calculates the search score by an operation including multiplying the matching degree by information about the frequency of appearance of the key word in the query received in the input unit in each reference query and each reference query's answer.
2. The question-answering device according to claim 1, further comprising:
a retrieval unit that extracts the keyword from the query received in the input unit, and performs a keyword search on the plurality of question-answer pairs stored in the question-answer pair storing unit as search objects by using the extracted keyword,
wherein the calculation unit reads out the groups of the style and the topic of each reference query, which is included in the search results of the retrieval unit, from the analysis result storing unit, and determines a matching degree between each group of the style and the topic of the read-out reference query and the group of the style and the topic of the query decided in the analysis unit.
3. The question-answering device according to claim 1, further comprising:
a question-content matching degree table storing unit that stores a question-content matching degree table showing the matching degree between two groups of the styles and the topics,
wherein the calculation unit determines a matching degree between each group of the style and the topic of each reference query and the group of the style and the topic of the query determined in the analysis unit, by using the question-content matching degree table.
4. The question-answering device according to claim 1, wherein the calculation unit calculates a score that represents a matching degree between the keyword of the query received in the input unit and a keyword of each of the question-answer pairs, and
the narrowing unit narrows the search results of the query received by the input unit from the plurality of question-answer pairs stored in the question-answer pair storing unit, on the basis of the score calculated in the calculation unit and the matching degree determined in the calculation unit.
5. The question-answering device according to claim 1, wherein the information about the frequency of appearance of the key word is calculated of the key word by TF-IDF method.
6. A question-answering device comprising:
a question-answer pair storing means that stores a plurality of question-answer pairs composed of reference queries and their answers;
an analysis result storing means that stores groups of a style representing a type of a question of each reference query of said reference queries and a topic representing an object of a question of each reference query;
an input means that receives a query;
an analysis pattern storing means that stores a rule used to decide the groups of the style and the topic of the query received in the input means;
an analysis means that obtains the style and the topic from the query by analyzing the query received in the input means on a basis of the rule stored in the analysis pattern storing means, and decides the groups of the style and the topic of the query;
a calculation means that determines a matching degree between each group of the style and the topic of each reference query stored in the analysis result storing means and each group of the style and the topic of the query received in the input means decided by the analysis means, and
calculates a search score based on the matching degree and information about a frequency of appearance of a keyword in the query received in the input means in each reference query and each reference query's answer; and
a narrowing means that narrows search results of the query received in the input means from the plurality of question-answer pairs stored in the question-answer pair storing means into only question-answer pairs, of which the question contents match the query received in the input means, on a basis of the search score calculated by the calculation means,
wherein the calculation means calculates the search score by an operation including multiplying the matching degree by information about the frequency of appearance of the key word in the query received in the input unit in each reference query and each reference query's answer.
7. The question-answering device according to claim 6, wherein the information about the frequency of appearance of the key word is calculated of the key word by TF-IDF method.
8. A question-answering method performed by a question-answering device comprising:
an input step of receiving a query;
an analysis step of obtaining a style and a topic from the query by analyzing the query received in the input step on a basis of a rule stored in an analysis pattern storing unit, and deciding the groups of the style and the topic of the query;

a calculation step of determining a matching degree between each group of the style and the topic of a reference query stored in an analysis result storing unit and the group of the style and the topic of the query received in the input step, and calculating a search score based on the matching degree and information about a frequency of appearance of a keyword in the query received in the input step each reference query and each reference query's answer; and a narrowing step of narrowing search results of the query from a plurality of question-answer pairs stored in a question-answer pair storing unit into only question-answer pairs, of which the question contents match the query, on a basis of the search score calculated, wherein the question-answering device includes the question-answer pair storing unit that stores the plurality of question-answer pairs composed of the reference queries and their answers, the analysis result storing unit that stores groups of the style representing a type of the question of each reference query and the topic representing an object of the question of each reference query, and the analysis pattern storing unit that stores a rule used to decide the groups of the style and the topic of the query, wherein the calculation step comprises calculating the search score by an operation including multiplying the matching degree by information about the frequency of appearance of the key word in the query received in the input unit in each reference query and each reference query's answer.

9. The question-answering method according to claim 8, further comprising:

an extraction step of extracting a keyword from the query; and a search step of performing a keyword search on the plurality of question-answer pairs as search objects, that is stored in the question-answer pair storing unit, by using the extracted keyword, wherein in the calculation step, the groups of the style and the topic of each reference query, which is included in the search results of the search step, are read out from the analysis result storing unit; and a matching degree between each group of the style and the topic of the read-out reference query and the group of the style and the topic of the query is determined.

10. The question-answering method according to claim 8, wherein the question-answering device further includes a question-content matching degree table storing unit that stores a question-content matching degree table showing the matching degree between two groups of the styles and the topics, and in the calculation step, a matching degree between each group of the style and the topic of each reference query and the group of the style and the topic of the query is determined by using the question-content matching degree table.

11. The question-answering method according to claim 8, wherein in the calculation step, a score that represents a matching degree between a keyword of the query and a keyword of each of the question-answer pairs is calculated, and in the narrowing step, the search results of the query are narrowed from the plurality of question-answer pairs stored in the question-answer pair storing unit, on the basis of the score and the matching degree.

12. The question-answering method according to claim 8, wherein the information about the frequency of appearance of the key word is calculated of the key word by TF-IDF method.

13. A non-transitory recording medium recording thereon a question-answering program for performing a question-answering process by execution on a computer, the computer being connected to a question-answer pair storing unit that stores a plurality of question-answer pairs composed of reference queries and their answers, an analysis result storing unit that stores groups of a style representing a type of a question of each reference query of said reference queries and a topic representing an object of the question of each reference query, and an analysis pattern storing unit that stores a rule used to decide the groups of the style and the topic of the query, wherein the question-answering process includes:

an input process for receiving a query;

an analysis process for obtaining a style and a topic from the query by analyzing the query received in the input process on a basis of the rule stored in the analysis pattern storing unit, and deciding the groups of the style and the topic of the query;

a calculation process for determining a matching degree between each group of the style and the topic of each reference query stored in the analysis result storing unit and the group of the style and the topic of the query received in the input process, and calculating a search score based on the matching degree and information about a frequency of appearance of a keyword in the query received in the input process in each reference query and each reference query's answer; and a narrowing process for narrowing search results of the query from the plurality of question-answer unit stored in the question-answer pair storing unit into only question-answer pairs, of which the question contents match the query, on a basis of the search score calculated, wherein said calculation process calculates the search score by an operation including multiplying the matching degree by information about the frequency of appearance of the key word in the query received in the input unit in each reference query and each reference query's answer.

14. The non-transitory recording medium according to claim 13, wherein the information about the frequency of appearance of the key word is calculated of the key word by TF-IDF method.

* * * * *